United States Patent [19]

Matsui

[11] 4,118,722
[45] Oct. 3, 1978

[54] OPTICAL SYSTEM FOR INDICATION IN THE VIEWFINDER OF SINGLE-LENS REFLEX CAMERA

[75] Inventor: Sei Matsui, Chiba, Japan

[73] Assignee: Nippon Kogaku K.K., Tokyo, Japan

[21] Appl. No.: 734,246

[22] Filed: Oct. 20, 1976

[30] Foreign Application Priority Data

Oct. 28, 1975 [JP] Japan .................. 50-146053

[51] Int. Cl.² ............................................. G03B 19/12
[52] U.S. Cl. ....................................... 354/155; 354/289
[58] Field of Search ......................... 354/39, 53–57, 354/289, 155, 166, 199–201, 219, 224, 225; 352/171; D16/9

[56] References Cited

U.S. PATENT DOCUMENTS

| | | | |
|---|---|---|---|
| 3,094,911 | 6/1963 | Reiche et al. | 354/54 |
| 3,174,416 | 3/1965 | Heerklotz | 354/289 |
| 3,656,421 | 4/1972 | Ataka | 354/155 |
| 3,675,558 | 7/1972 | Kuramoto et al. | 354/289 X |
| 3,978,502 | 8/1976 | Okuno et al. | 354/225 |

Primary Examiner—L. T. Hix
Assistant Examiner—William B. Perkey
Attorney, Agent, or Firm—Fitzpatrick, Cella, Harper & Scinto

[57] ABSTRACT

The disclosure describes a compact and inexpensive optical system to be built in the viewfinder of a single-lens reflex camera for reading, in the viewfinder, an optical image of an indication element provided on the outside of the viewfinder. The optical system comprises a pentagonal Dach-prism having a light transmitting portion provided thereon, a first reflecting member and a second reflective member. The first and second reflective members have a specific positional relation to each other and also relative to the light transmitting portion of the prism so that an information carrying light beam coming from the indication element may reach the eyepiece of the viewfinder along a shortest possible light path.

1 Claim, 2 Drawing Figures

OPTICAL SYSTEM FOR INDICATION IN THE VIEWFINDER OF SINGLE-LENS REFLEX CAMERA

BACKGROUND OF THE INVENTION

1. Field of the Invention

The present invention relates to an optical system for indication in the viewfinder of a single-lens reflex camera.

2. Description of the Prior Art

Hitherto there have been known a number of optical systems for indication in the viewfinder of a single-lens reflex camera. One of such conventional optical systems is designed to have an additional pentagonal prism bonded to the pentagonal Dach-prism of the viewfinder. The information beam coming from an indication element provided outside of the viewfinder is at first directed to the additional pentagonal prism in which the beam is twice reflected and thereafter led to an eyepiece of the viewfinder through the pentagonal Dach-prism. This optical system necessitates machining the additional pentagonal prism and incurring a substantial cost therefor. For that reason, it cannot produce any remarkable advantage at any rate. Apart from that fact, this optical system has the drawback that it lacks means that permit correction of any possible incorrectness caused by machining errors, mounting errors and the like.

Another example of the prior art optical system for indication in the viewfinder is shown in FIG. 1.

In order to direct the information beam coming from an indication element 1 to an eyepiece 4 through a pentagonal Dach-prism 3, this optical system further comprises a first reflective member 2a, a second reflective member 2b and a concave lens 2c interposed in the light path between said first and second reflective members. The first reflective member 2a is upwardly spaced from the third reflection surface 3a of the pentagonal Dach-prism 3. The second reflective member 2b is adjacent to said third reflection surface 3a. The concave lens 2c is provided to adjust the length of light path. The information beam is reflected by the first reflective member 2a to impinge upon the second reflective member 2b through the light path length adjusting lens 2c. Then, the second reflective member 2b reflects the information beam to the prism 3 so that it may reach the eyepiece 4 after passing through the pentagonal Dach-prism 3.

According to the conventional optical system as shown in FIG. 1, it is possible to compensate, to some extent, for any possible incorrectness caused by machining errors, mounting errors and the like by adjusting the first and/or second reflective members. However, arrangement of said two reflective members should be made so that the second reflective member never interrupts the information beam incident upon the first reflective member. This arrangement caused the optical path to lengthen and, therefore, makes it necessary to additionally provide a concave lens such as the lens 2c so as to adjust the optical path length. As a result, the body size of the apparatus itself in which the optical system is incorporated, has to be enlarged accordingly.

SUMMARY OF THE INVENTION

Accordingly, it is a general object of this invention to provide a novel optical system for indication in the viewfinder of a single-lens reflex camera, which eliminates the disadvantages of the known optical systems mentioned above and which is simple and compact in structure and has an excellent practical adaptability as well as remarkable advantages regarding cost and manufacture.

Other and further objects, features and advantages of the invention will appear more fully from the following description.

According to the present invention, there is provided an optical system for use in reading in a viewfinder information of an indication element placed on the object side of the prism, which optical system comprises a pentagonal Dach-prism having a light transmitting portion provided in the vicinity of the boundary between the third reflection surface of said prism where the light beam from an objective undergoes its third reflection following the reflection by the Dach-surface, and the non-reflection surface adjacent to and lying above said third reflection surface, a first reflective member positioned in the vicinity of said light transmitting position, but on the non-reflection surface side thereof so as to reflect the information carrying light beam of said indication element toward the direction distant away from the pentagonal Dach-prism and a second reflective member positioned further away from said prism than that of the light path between said indication element and said first reflective member so as to reflect the information carrying light beam reflected by said first reflective member so that the reflected beam segment intersects the beam segment incident upon the first reflective member and then reaches an eyepiece passing through said light transmitting portion.

DESCRIPTION OF THE PREFERRED EMBODIMENT

Figure 1:
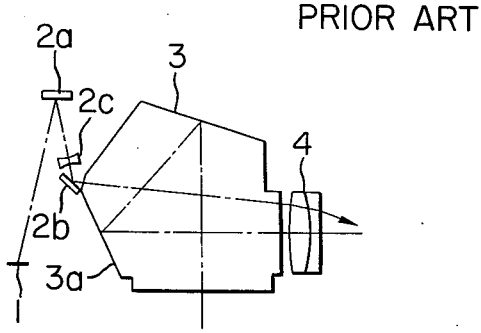
FIG. 1 is a schematic cross sectional view of an optical system for indication in a viewfinder of the prior art.
Figure 2:
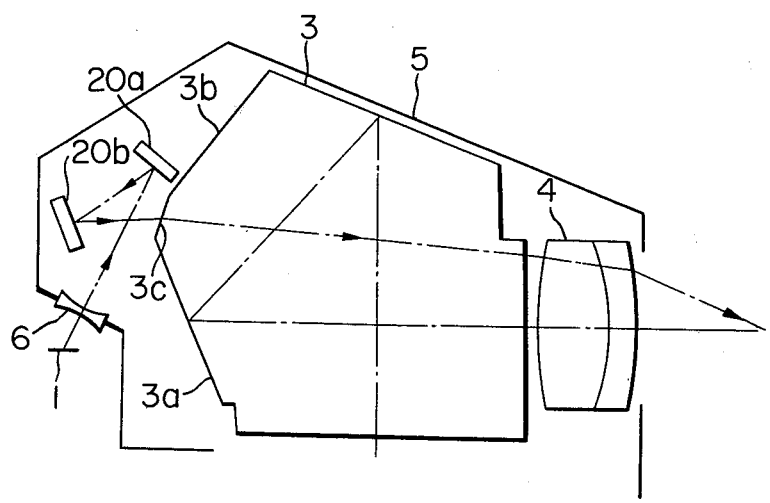
FIG. 2 is a schematic cross sectional view of an optical system, in a preferred embodiment, according to the present invention.

Referring to FIG. 2 showing a preferred embodiment of the present invention, the optical system is one for use in directing the optical image of an indication element 1 to the upper area of the visual field of a viewfinder the main part of the body or housing of which is generally designated 5 and encases a pentagonal Dach-prism 3. The indication element 1 is placed on the object side of the body of the viewfinder 5 outside thereof with its indication surface directed upwardly. The body of the viewfinder 5 has a transparent member 6 formed as an integral portion thereof. The information carrying light beam coming from the indication element 1, at first, passes through the transparent member 6 and then impinges upon a first reflective mirror 20a which is positioned in the vicinity of the boundary between the third reflection surface 3a of the pentagonal Dach-prism 3 and the non-reflection surface 3b lying above the surface 3a. In this embodiment, the transparent member 6 is shaped as a concave lens having diverging effect so as to reduce the image of the indication element 1. The information beam is reflected by the first reflective mirror 20a toward the direction away from the pentagonal Dach-prism 3. The reflected beam impinges upon a second reflective mirror 20b provided in a position further spaced from the pentagonal Dach-prism 3 than the light path between the indication element 1 and the first reflective mirror 20a. The second reflective mirror 20b reflects the information beam into a light transmitting portion 3c provided in the vicinity of the boundary between the third reflection surface 3a and the non-reflection surface 3b. The information beam thus reflected passes through the pentagonal Dach-prism 3 by which the beam is slightly refracted, and then reaches an eyepiece 4.

In this embodiment, the light transmitting portion 3c is somewhat inclined relative to the third reflection surface 3a as well as to the non-reflection surface 3b. However, it is not always necessary to have the portion 3c inclined relative to the two surfaces 3a and 3b. The plane of the light transmitting portion 3c may be coplanar with the third reflection surface 3a or the non-reflection surface 3b so long as the portion 3c lies in the vicinity of the boundary as defined above. When the portion 3c is suitably inclined relative to the third reflection surface 3a as shown in FIG. 2, the indication element 1 and the second reflective mirror 20b may be arranged more closely to the pentagonal Dach-prism 3, which in turn permits a more compact structure as a whole.

The first and second reflective mirrors 20a and 20b shown in FIG. 2 may be of the same configuration. This embodiment will bring forth another advantage of convenience in manufacture and reduction in manufacture cost. As clearly seen from FIG. 2, the transparent portion or a concave lens 6 is set up to form an integral portion of the body of the viewfinder 5. This feature is of importance because it enables the interior of the viewfinder to be tightly sealed against any entrance of dust while maintaining the optical combination of the indication element 1 placed in the exterior of the viewfinder and the interior thereof. In the embodiment of FIG. 2, the transparent portion 6 is shown to be a concave lens having diverging effect to reduce the image of the indication element 1. However, if desired on account of the size of the indication element 1, the transparent portion 6 may be shaped to have converging effect.

The unique arrangement of two reflective mirrors according to the present invention allows the whole optical system for indiciation in the viewfinder to be made more compact than the prior art ones are. As a result, the optical path length becomes so short that means for adjusting the optical path length may be no longer necessary for the optical system. For the same reason, assembly also becomes easy. Any possible incorrectness caused by machining errors, mounting errors or the like can be compensated for very simply by adequate adjustment of said two reflective mirrors.

While the invention has been particularly shown and described with reference to a preferred embodiment thereof, it will be understood by those skilled in the art that the foregoing and other changes in form and details can be made therein without departing from the spirit and scope of the invention.

What is claimed is:

1. An optical system built in the viewfinder of a single-lens reflex camera for directing an information carrying light beam from an indication element provided on the object side of the body of said viewfinder to an eyepiece, comprising:
   (a) a pentagonal Dach-prism having a light transmitting portion provided on a surface between the third reflective surface of said prism, where a light beam from an objective mounted on the camera undergoes its third reflection following the reflection by the Dach-surface, and the non-reflection surface adjacent to and lying above said third reflection surface;
   (b) a first reflective member positioned in the vicinity of said light transmitting portion, and on the non-reflection surface side thereof, so as to reflect the information carrying light beam of said indication element in a direction away from said pentagonal Dach-prism;
   (c) a second reflective member provided in a position spaced further from said prism than that of the light path between said indication element and said first reflective member, to reflect the information carrying light beam reflected by said first reflective member to intersect the beam segment incident upon the first reflective member and then to said eyepiece after passing through said light transmitting portion,
   said first reflective member and said second reflective member being separated from each other and air intervening therebetween; and
   (d) a negative lens member provided in the light path extending from said indication element to said first reflective member and being integral with the body of the viewfinder, thereby to seal the interior of the viewfinder from its exterior, said indication element being located exterior of said viewfinder.

* * * * *